US009051758B2

(12) United States Patent  (10) Patent No.: US 9,051,758 B2
Cuddy et al.  (45) Date of Patent: Jun. 9, 2015

(54) DOOR SNUBBER AND STRIKE PLATE

(71) Applicant: The Boeing Company, Chicago, IL (US)

(72) Inventors: Nathanial C. Cuddy, Snohomish, WA (US); Paul Thomas Bridgeman, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/954,950

(22) Filed: Jul. 30, 2013

(65) Prior Publication Data
US 2015/0033634 A1  Feb. 5, 2015

(51) Int. Cl.
*E05B 15/02* (2006.01)
*E06B 3/70* (2006.01)

(52) U.S. Cl.
CPC ..... *E05B 15/0205* (2013.01); *E06B 2003/7046* (2013.01)

(58) Field of Classification Search
CPC .................. E06B 2003/7046; E05B 15/0205
USPC .................. 49/402, 379, 400, 401, 394, 364; 244/129.4, 129.5, 118.5; 292/1, 292/DIG. 56, DIG. 73, 340
See application file for complete search history.

(56) References Cited

U.S. PATENT DOCUMENTS

| | | | | | |
|---|---|---|---|---|---|
| 435,109 | A | * | 8/1890 | Woodcock | 292/221 |
| 1,305,212 | A | * | 5/1919 | Hitchcock | 292/18 |
| 1,318,382 | A | * | 10/1919 | Herby | 292/341.12 |
| 1,741,354 | A | * | 12/1929 | Axe | 49/415 |
| 1,829,916 | A | * | 11/1931 | Winans | 16/85 |
| 1,896,363 | A | * | 2/1933 | Johnson | 292/99 |
| 2,162,929 | A | * | 6/1939 | Armstrong | 292/335 |
| 3,159,093 | A | * | 12/1964 | Rosenfeld | 49/401 |
| 3,605,459 | A | * | 9/1971 | Van Dalen | 70/144 |
| 3,860,994 | A | * | 1/1975 | Itoda et al. | 16/289 |
| 4,208,837 | A | * | 6/1980 | Black et al. | 49/56 |
| 4,714,285 | A | * | 12/1987 | Langham | 292/163 |
| 5,092,637 | A | * | 3/1992 | Miller | 292/173 |
| 5,184,422 | A | * | 2/1993 | Wade et al. | 49/239 |
| 5,289,615 | A | | 3/1994 | Banks et al. | |
| 5,473,841 | A | * | 12/1995 | Grillo | 49/394 |
| 5,687,452 | A | | 11/1997 | Hamatani et al. | |
| 6,357,803 | B1 | * | 3/2002 | Lorek | 292/99 |
| 6,471,265 | B1 | * | 10/2002 | Scott, Sr. | 292/341.15 |
| 6,684,570 | B1 | * | 2/2004 | Robledo | 49/394 |
| 8,707,625 | B2 | * | 4/2014 | Raz et al. | 49/400 |

* cited by examiner

*Primary Examiner* — Katherine Mitchell
*Assistant Examiner* — Marcus Menezes
(74) *Attorney, Agent, or Firm* — Hugh P. Gortler

(57) ABSTRACT

A structure comprises a door, a frame for the door, and a door snubber. One of the frame and the door has an overlapping edge trim, and the other carries the snubber such that the snubber engages the edge trim when the door is closed on the frame.

11 Claims, 4 Drawing Sheets

DOOR SNUBBER AND STRIKE PLATE

BACKGROUND

A strike plate may be used to engage a door latch and hold a door closed. A door snubber may be used in combination with the strike plate. The door snubber engages the closed door to keep it in tension to reduce vibrational noise.

SUMMARY

According to an embodiment herein, a structure comprises a door, a frame for the door, and a door snubber. One of the frame and the door has an overlapping edge trim, and the other carries the snubber such that the snubber engages the edge trim when the door is closed on the frame.

According to another embodiment herein, an aircraft compartment comprises a door and door frame. The door has edge trim that overlaps the frame when the door is closed. The compartment further comprises a mechanism including a strike plate and a snubber attached to the frame. The snubber engages the edge trim when the door is closed and also biases the door away from the frame.

According to another embodiment herein, a mechanism comprises an integrated snubber and strike plate. The strike plate has a latch receptacle and first and second retaining housings on opposite sides of the receptacle. The door snubber includes first and second bearing pads extending from the first and second retaining housings. The bearing pads are biased away from the strike plate.

According to another embodiment herein, a method for a door subject to external vibrations comprises closing the door on a frame having overlapping edge trim such that a latching mechanism on the door engages a strike plate on the frame; and applying force between the trim and the strike plate to bias the door away from the trim to keep a gap between the door and trim consistent under the vibrations.

These features and functions may be achieved independently in various embodiments or may be combined in other embodiments. Further details of the embodiments can be seen with reference to the following description and drawings.

DETAILED DESCRIPTION

Figure 1:
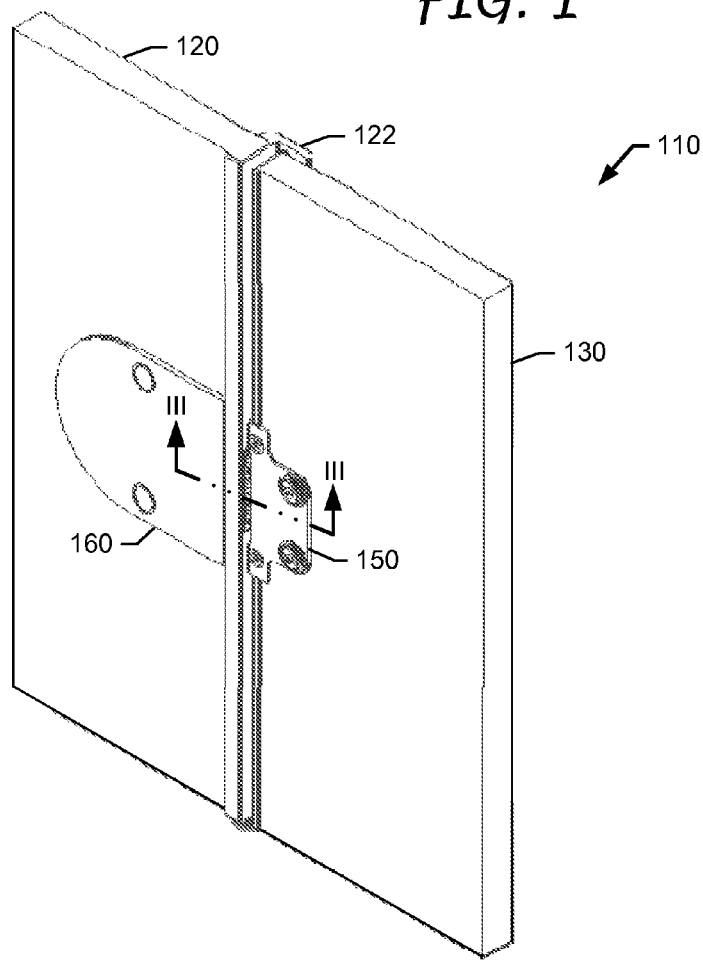
FIGS. 1 and 2 are illustrations of a structure including a door, a frame for the door, a door snubber, and a strike plate.
Figure 2:
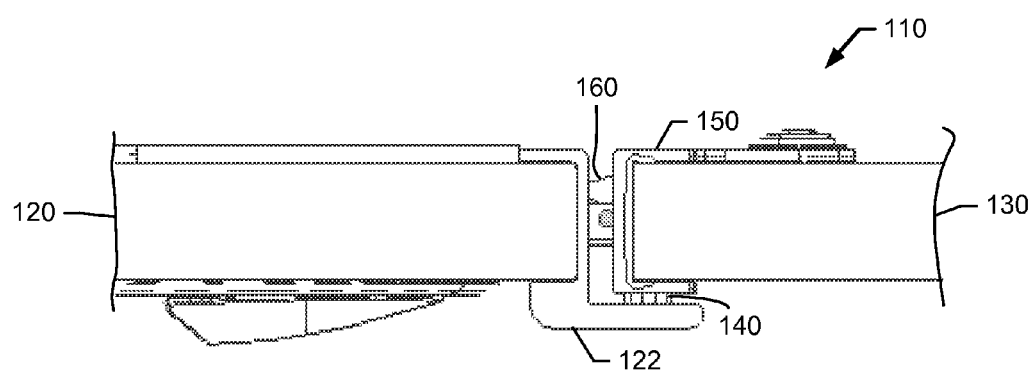
Figure 3:
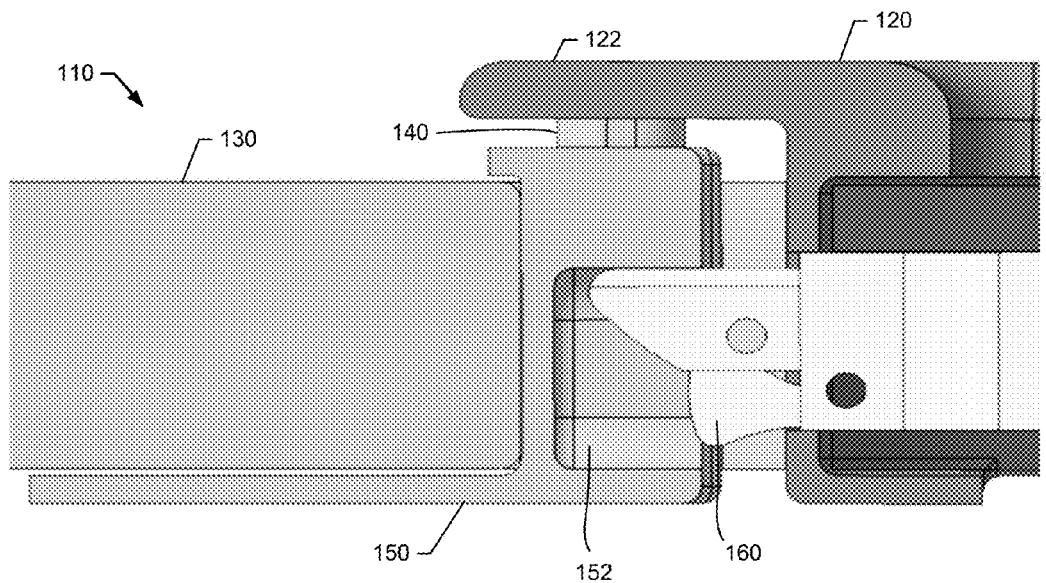
FIG. 3 is a cross-sectional view of the structure, taken along lines III-III in FIG. 1.

Reference is made to FIGS. 1-3, which illustrates a structure 110 including first and second elements 120 and 130. In a first embodiment of the structure 110, the first element is a door 120 and the second element is a frame 130 for the door 120. The door 120 is movable between an open position and a closed position with respect to the frame 130. The door 120 may be hinged to the frame 130, or it may be hingeless, slide, roll-up, etc. The frame 130 may fully or partially encompass the door 120, or it may be adjacent an edge of the door 120, etc.

Either the door 120 or the frame or 130 has overlapping edge trim. In the embodiment illustrated in FIGS. 1-3, the door 120 has the overlapping trim 122. When the door 120 is in the closed position, as shown in FIGS. 1-3, an edge of the frame 130 is proximate the edge trim 122, with the trim 122 overlapping the edge of the frame 130.

The structure 110 further includes a snubber 140. In the embodiment illustrated in FIGS. 1-3, the frame 130 carries the snubber 140 such that the snubber 140 engages the edge trim 122 when the door 120 is closed on and latched to the frame 130. The snubber 140 creates a positive engagement to load the door 120 while the door 120 is closed and latched. For example, the snubber 140 may bias the door 120 away from the edge trim 122 to keep the closed door 120 in tension. Such loading of the door 120 reduces vibrational noise. The snubber 140 also prevents noise caused by slamming the door 120.

Locating the snubber at an edge of the frame 130 and engaging the edge trim 122 is advantageous for storage compartments. Unlike conventional designs, the snubber 140 does not extend into the compartment threshold. Consequently, storage volume is increased.

A strike plate 150 and latching mechanism 160 (best shown in FIG. 3) may be used to latch the door 120 to the frame 130. In the embodiment illustrated in FIGS. 1-3, the strike plate 150 is carried by the frame 130, and the latching mechanism 160 is carried by the door 120. Examples of the latching mechanism 160 include, but are not limited to, a deadbolt, articulating-type latch, and magnetic latch. The magnetic latch may use an electromagnet instead of a mechanical latch to magnetically engage the strike plate 150, or it may use an electromagnetic actuator to cause a bolt to mechanically engage the strike plate 150. FIG. 3 illustrates an articulating-type latch 160 that engages the strike plate 150 by extending into an opening 152 in the strike plate 150.

The snubber 140 and the strike plate 150 may be separate mechanisms, or they may be integrated into a single mechanism. An example of a mechanism including an integrated snubber and strike plate is illustrated in FIGS. 4 and 5.

In a second embodiment of the structure 110, the first element is the frame 120 and the second element is the door 130. In this second embodiment, the frame 120 has the overlapping trim 122, and it carries the latching mechanism 160, while the door 130 carries the snubber 140 and strike plate 150. In this second embodiment as well, the snubber 140 engages the edge trim 122 when the door 130 is closed on and latched to the frame 120.

Figure 4:
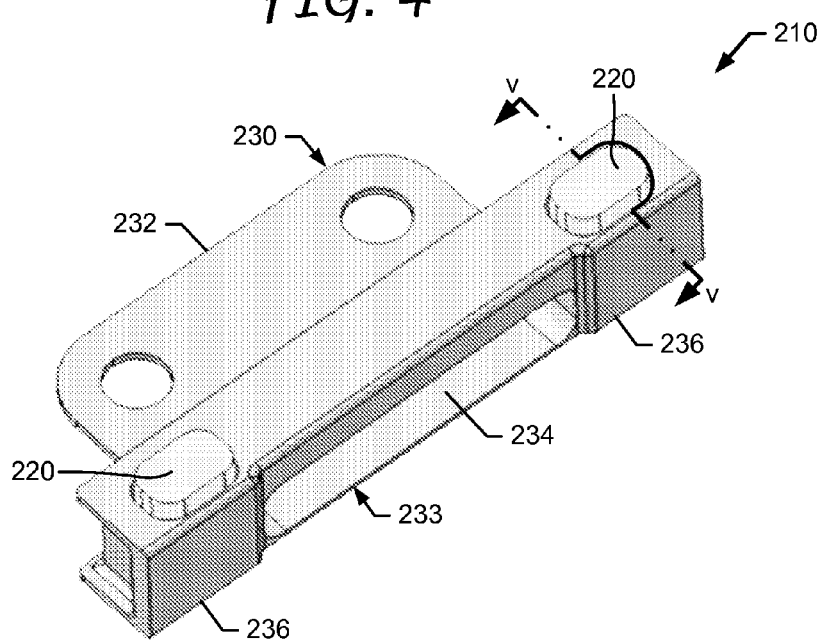
FIG. 4 is an illustration of a mechanism including an integrated door snubber and strike plate.
Figure 5:
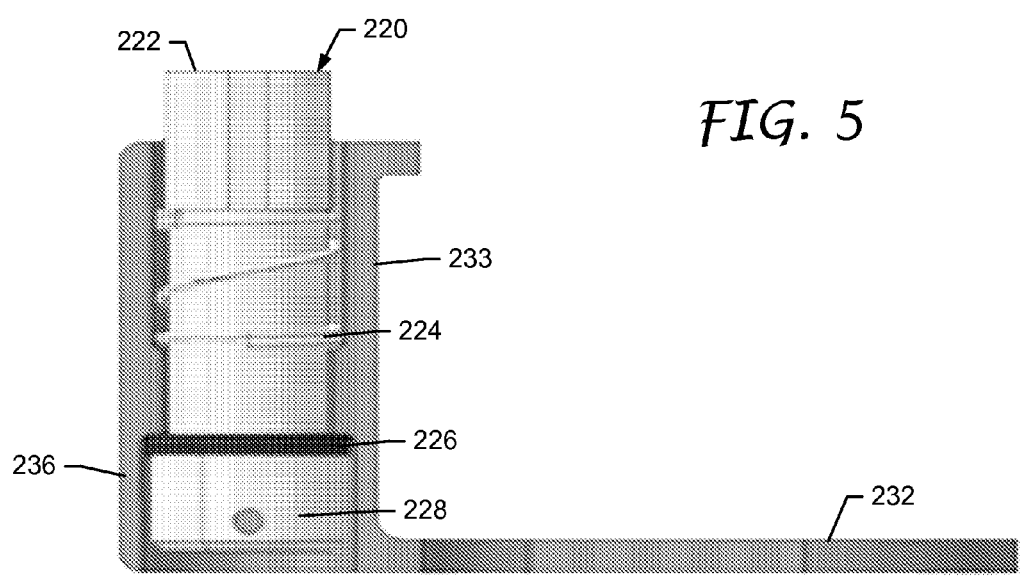
FIG. 5 is a cross-sectional view of the mechanism, taken along lines V-V in FIG. 4.

Reference is now made to FIGS. 4-5, which illustrate a mechanism 210 including first and second snubbers 220 integrated with a strike plate 230. The strike plate 230 includes a mounting flange 232 and a body 233. The mounting flange 232 and the body 233 define a latch receptacle 234 for receiving a latching mechanism. The snubbers 220 are located on opposite sides of the receptacle 234. By locating the snubbers 220 on opposite sides of the receptacle 234, the door is evenly biased away from the edge trim, and a gap between the door and the edge trim is kept consistent under external vibrations (e.g., vibrations resulting from mechanical engine vibration and also from turbulent air on a fuselage during flight).

FIG. 5 illustrates an example of how the first and second snubbers 220 may be integrated with the body 233 of the strike plate 230. The body 233 includes first and second retaining housings 236 that form opposite sides of the receptacle 234. Each retaining housing 236 may have a cylindrical counterbore for housing one of the snubbers 220. Each snubber 220 includes a bearing pad 222 movable within the counterbore of its retaining housing 236, and a dampener (e.g., a spring) 224 for the bearing pad 222. The dampener 224 is also located within the counterbore of the retaining housing 236. Each snubber 220 may further include a washer 226 that bears on the retaining housing 236 and a fastener 228 that holds the bearing pad 222 and dampener 224 within the counterbore of the retaining housing 236 during operation.

The mechanism 210 may be affixed to a frame, for example, by forming a notch at an edge of the frame, fitting the body 233 in the notch, and then fastening the flange 232 to a backside of the frame. The mechanism 210 may be attached to a door in a similar manner.

Although the mechanism 210 of FIGS. 4 and 5 has two snubbers 220, other configurations may have different numbers of snubbers 220. Another configuration may have only a single snubber. Configurations for large span doors or doors needing a larger preload may have more than two snubbers. The additional snubbers may or may not be integrated with the strike plate.

Although the mechanism 210 is shown with a mounting flange 232, it is not so limited. Other configurations may be secured to a door or frame in other ways.

In the mechanism 210 illustrated in FIGS. 4 and 5, the flange 232 is said to have an orientation of ninety degrees with respect to the body 233. However, a mechanism herein is not limited to a ninety degree orientation so long as its snubber engages edge trim when the door is closed and latched.

Figure 6:
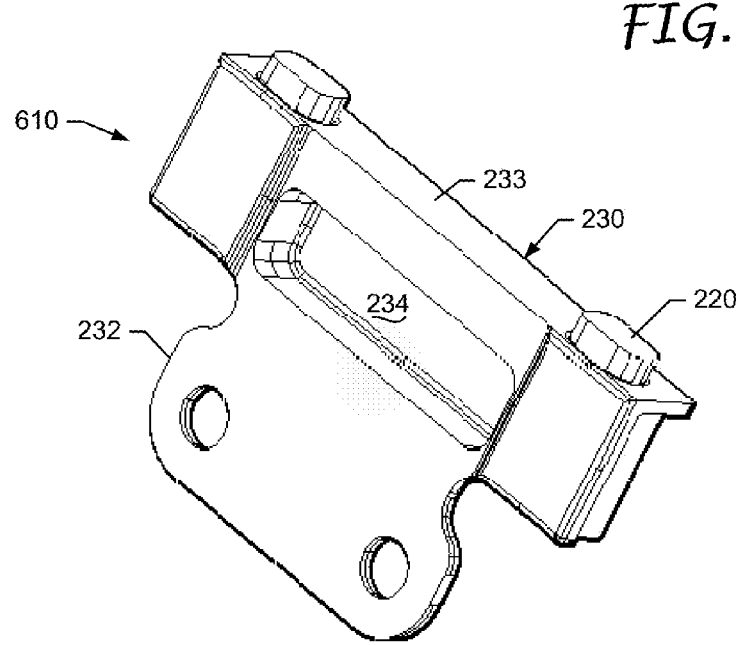
FIG. 6 is an illustration of a mechanism including an integrated door snubber and strike plate.
Figure 7:
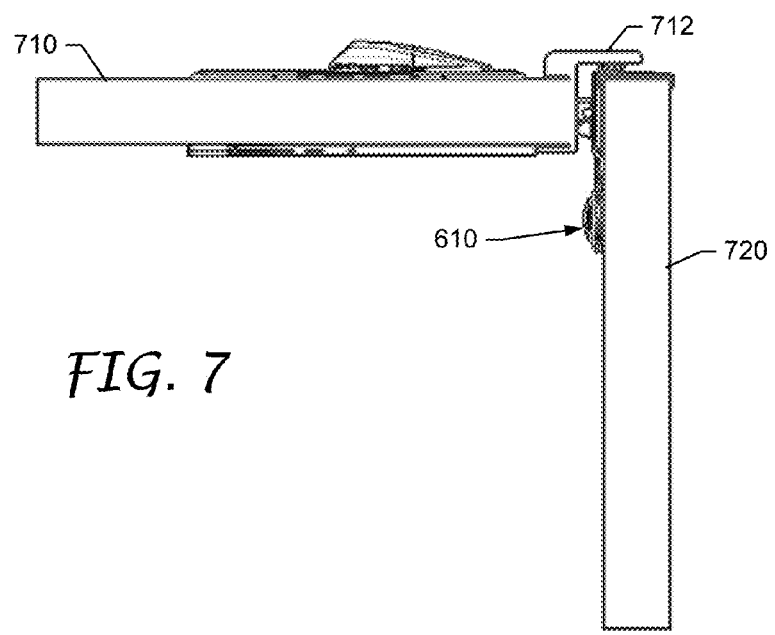
FIG. 7 is an illustration of a structure including a door, a frame for the door, and the mechanism of FIG. 6.

FIG. 6 illustrates a mechanism 610 including a strike plate 230 in which the flange 232 is said to have an orientation of zero degrees with respect to the body 233. As illustrated in FIG. 7, this mechanism 610 enables a door 710 to be closed at a ninety degree angle with respect to a frame 720. When the door 710 is closed, a latch mechanism extends into the receptacle 234 in the strike plate 230, and the snubbers 220 engage edge trim 712 of the door 710.

In some embodiments, a single mechanism may be attached to a door or frame. In other embodiments, more than one mechanism may be attached to a door or frame.

A structure herein is not limited to any particular application. A structure herein may be applied to a house or building. For instance, a structure herein may be used as an exterior door and frame, or a cabinet or closet within the house or building.

A structure herein may be applied to a transportation vehicle such as an aircraft, train, ship, recreational vehicle (RV), automobile or space craft. For instance, a structure herein may be used for a storage compartment within a transportation vehicle.

Figure 8:
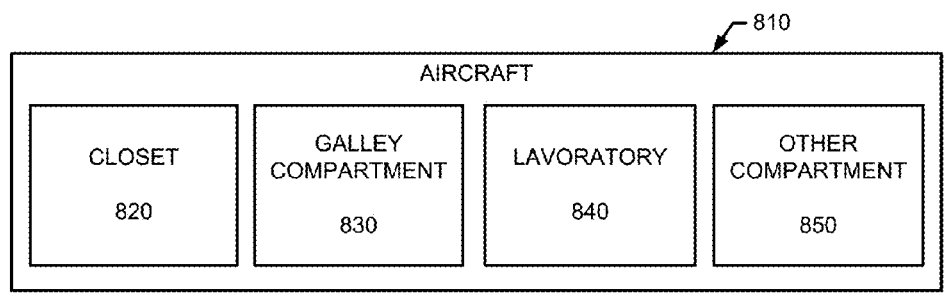
FIG. 8 is an illustration of an aircraft.

Reference is made to FIG. 8. Of particular interest to the assignee is a transportation vehicle such as a commercial aircraft 810. A structure herein may be used in a cabin closet 820, galley compartment 830, lavatory 840, or other compartment 850 (e.g., trash compartment, linen closet, access panel, miscellaneous stowage compartment, emergency equipment compartment, drawer) within an aircraft 810. The snubbers dampen door vibrations resulting from mechanical engine vibration as well as turbulent air on the aircraft 810 during flight.

The integration of the strike plate and the snubber into a single mechanism is especially advantageous for commercial aircraft. The single mechanism offers a lightweight, compact dampening latch system for vibration resistance.

The single mechanism is easier to install than a strike plate and a separate snubber since there are fewer holes to drill and fewer fasteners to install. Rework time is also reduced since there are fewer holes to drill and fewer fasteners to install. Savings in installation time is expected to be significant for commercial aircraft.

Moreover, the single mechanism is lighter than a strike plate and a separate snubber. Weight reduction is especially important for commercial aircraft, as reducing the weight reduces fuel consumption and other aircraft operating costs.

The invention claimed is:

1. A structure comprising:
   a door;
   a frame for the door; and
   a strike plate including a body that forms a latch receptacle and a retaining housing; a door snubber including a bearing pad that is movable within the retaining housing; and a latching mechanism including a latch for engaging the strike plate when the door is closed on the frame;
   wherein one of the frame and the door has overlapping edge trim, and the other of the frame and the door carries the snubber; wherein the bearing pad is movable in a first direction to engage and bias the edge trim away, and the latch is moveable in a second direction to engage the strike plate to prevent the door from being opened; and wherein the first and second directions are orthogonal.

2. The structure of claim 1, wherein the frame has the edge trim, and wherein the snubber is located at an edge of the door.

3. The structure of claim 1, wherein the retaining housing is a first retaining housing, wherein the door snubber is a first snubber, and wherein the bearing pad is a first bearing pad movable within the first retaining housing, and a first bearing pad dampener located within the first retaining housing.

4. The structure of claim 3, wherein the strike plate further includes a second retaining housing spaced apart from the first retaining housing; and wherein a second snubber includes a second bearing pad movable within the second retaining housing, and a second bearing pad dampener located within the second retaining housing.

5. The structure of claim 1, wherein the strike plate includes a mounting flange oriented zero degrees with respect to the body.

6. The structure of claim 1, wherein the strike plate includes a mounting flange oriented ninety degrees with respect to the body.

7. An aircraft compartment comprising the structure of claim 1, wherein:
   the door has the edge trim, which overlaps the frame when the door is closed; and
   the snubber is attached to the frame such that the snubber engages the edge trim when the door is closed and also biases the door away from the frame.

8. The aircraft compartment of claim 7, wherein the retaining housing is a first retaining housing, wherein the door snubber is a first snubber, and wherein the bearing pad is a first bearing pad movable within the first retaining housing, and a first bearing pad dampener is located within the first retaining housing.

9. The aircraft compartment of claim 8, wherein the body further includes a second retaining housing spaced apart from the first retaining housing to form the latch receptacle; and wherein a second snubber having a second bearing pad is movable within the second retaining housing, and a second bearing pad dampener located within the second retaining housing.

10. The aircraft compartment of claim 7, wherein the strike plate further includes a mounting flange oriented zero degrees with respect to the body.

11. The aircraft compartment of claim 7, wherein the strike plate further includes a mounting flange oriented ninety degrees with respect to the body.

\* \* \* \* \*